United States Patent
Kowalkowski et al.

(10) Patent No.: US 8,863,499 B2
(45) Date of Patent: Oct. 21, 2014

(54) SYSTEM FOR INDICATING QUALITY OF A DIESEL EXHAUST FLUID ("DEF")

(75) Inventors: Janean E. Kowalkowski, Northville, MI (US); Robert J. Sutschek, South Lyon, MI (US); John Coppola, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 13/468,318

(22) Filed: May 10, 2012

(65) Prior Publication Data
US 2013/0298533 A1    Nov. 14, 2013

(51) Int. Cl.
*F01N 11/00*    (2006.01)

(52) U.S. Cl.
USPC .............. 60/286; 60/276; 60/277; 60/295; 60/301

(58) Field of Classification Search
CPC . F01N 2900/1818; F01N 3/208; F01N 11/00; F01N 2560/026; F01N 2610/02; Y02T 10/24; Y02T 10/47
USPC .............................. 60/276, 277, 286, 295, 301
See application file for complete search history.

(56) References Cited

U.S. PATENT DOCUMENTS

| | | | |
|---|---|---|---|
| 2008/0022658 A1* | 1/2008 | Viola et al. | 60/286 |
| 2011/0061363 A1 | 3/2011 | Levijoki et al. | |
| 2011/0209461 A1* | 9/2011 | Bays et al. | 60/274 |
| 2012/0085082 A1* | 4/2012 | Levijoki et al. | 60/274 |
| 2013/0000276 A1* | 1/2013 | Grichnik et al. | 60/274 |
| 2013/0152545 A1* | 6/2013 | Chavannavar | 60/274 |

FOREIGN PATENT DOCUMENTS

DE    102005027378 B3    11/2006

OTHER PUBLICATIONS

German Office Action for Application No. 102013208271.1 dated Jul. 11, 2014; 7 pages.

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

An exhaust gas treatment system for an internal combustion engine is provided having an exhaust gas conduit, a diesel exhaust fluid ("DEF") source, a selective catalytic reduction ("SCR") device, a $NO_x$ sensor, and a control module. The DEF source supplies a DEF having a quality factor. The $NO_x$ sensor is in fluid communication with the exhaust gas conduit. The $NO_x$ sensor is located downstream of the SCR device and is configured for detecting a $NO_x$ concentration value. The control module is in communication with the DEF source and the $NO_x$ sensor. The control module stores a diagnostic adaptation factor and an expected $NO_x$ value. The control module includes a dosing module for determining a controls adaptation factor that is based on a deviation between the $NO_x$ concentration value and the expected $NO_x$ value. The diagnostic adaptation factor is selectively updated with the controls adaptation factor.

20 Claims, 2 Drawing Sheets

SYSTEM FOR INDICATING QUALITY OF A DIESEL EXHAUST FLUID ("DEF")

FIELD OF THE INVENTION

Exemplary embodiments of the invention relate to exhaust gas treatment systems for internal combustion engines and, more particularly, to an exhaust gas treatment system for indicating quality of a diesel exhaust fluid ("DEF").

BACKGROUND

The exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing $NO_x$ emissions is a selective catalytic reduction ("SCR") device. A reductant or diesel exhaust fluid ("DEF") is typically sprayed or injected into hot exhaust gases upstream of the SCR device. The reductant may be an aqueous urea solution that decomposes to ammonia ("$NH_3$") in the hot exhaust gases and is absorbed by the SCR device. The ammonia then reduces the $NO_x$ to nitrogen in the presence of the SCR catalyst. In the event reductant is not present, or if the reductant is of relatively low quality, then the SCR device may not be able to efficiently reduce the $NO_x$ to nitrogen. The quality of reductant generally pertains to the percentage and the purity of the urea present in the reductant.

Government regulations require the detection of low quality reductant. Specifically, the detection of low quality reductant is correlated to emissions (i.e., the level of $NO_x$ in the exhaust gas emitted to the atmosphere). Detection is required shortly after start of vehicle operation. In one approach to detect low quality reductant, $NO_x$ sensors may be placed in the exhaust gas stream to indicate efficiency of the SCR device. Specifically, a $NO_x$ sensor is placed upstream of the SCR device and another $NO_x$ sensor is placed downstream of the SCR device. However, this approach may not always accurately determine the quality of the reductant. This is because other factors, such as a deteriorated SCR substrate, or the inability to deliver the reductant to the SCR device may also affect the efficiency of the SCR device. Accordingly, it is desirable to provide a system and method of determining reductant quality.

SUMMARY OF THE INVENTION

In one exemplary embodiment of the invention, an exhaust gas treatment system for an internal combustion engine is provided. The exhaust gas treatment system has an exhaust gas conduit, a diesel exhaust fluid ("DEF") source, a selective catalytic reduction ("SCR") device, a $NO_x$ sensor, and a control module. The DEF source is in fluid communication with the exhaust gas conduit. The DEF source supplies a DEF having a quality factor. The SCR device is in fluid communication with the exhaust gas conduit and is configured to receive the exhaust gas. The $NO_x$ sensor is in fluid communication with the exhaust gas conduit. The $NO_x$ sensor is located downstream of the SCR device and is configured for detecting a $NO_x$ concentration value. The control module is in communication with the DEF source and the $NO_x$ sensor. The control module stores a diagnostic adaptation factor and an expected $NO_x$ value. The diagnostic adaptation factor is an indication of the quality factor for the DEF. The control module includes a dosing module for determining a controls adaptation value based on a deviation between the $NO_x$ concentration value and the expected $NO_x$ value. The diagnostic adaptation factor is selectively updated with the controls adaptation factor.

In another exemplary embodiment of the invention, an exhaust gas treatment system for an internal combustion engine is provided. The engine includes a plurality of operating parameters. The exhaust gas treatment system includes an exhaust gas conduit, a DEF source, an SCR device, and a control module. The DEF source is in fluid communication with the exhaust gas conduit. The DEF source supplies a DEF that includes a quality factor. The SCR device is in fluid communication with the exhaust gas conduit and is configured to receive the exhaust gas. The control module is in communication with the DEF source and the engine. The control module determines an upstream $NO_x$ concentration level of the SCR device and a downstream $NO_x$ concentration level of the SCR device based on the plurality of operating parameters of the engine. The control module is selectively activated to perform a reductant fluid quality test. The control module stores a diagnostic adaptation factor that is an indication of the quality factor for the DEF. The control module includes an efficiency diagnostic module for determining an SCR efficiency value based on the upstream $NO_x$ concentration level and the downstream $NO_x$ concentration level. The control module includes an evaluation module for determining if the SCR efficiency value is greater than an SCR Efficiency Threshold value. The diagnostic adaptation factor is set to a controls adaptation factor if the SCR efficiency value is greater than the SCR Efficiency Threshold value. That is, in other words, if the reductant fluid quality test is performed, and if the reductant fluid quality test passes, then the diagnostic adaptation factor is updated to the control adaptation factor.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
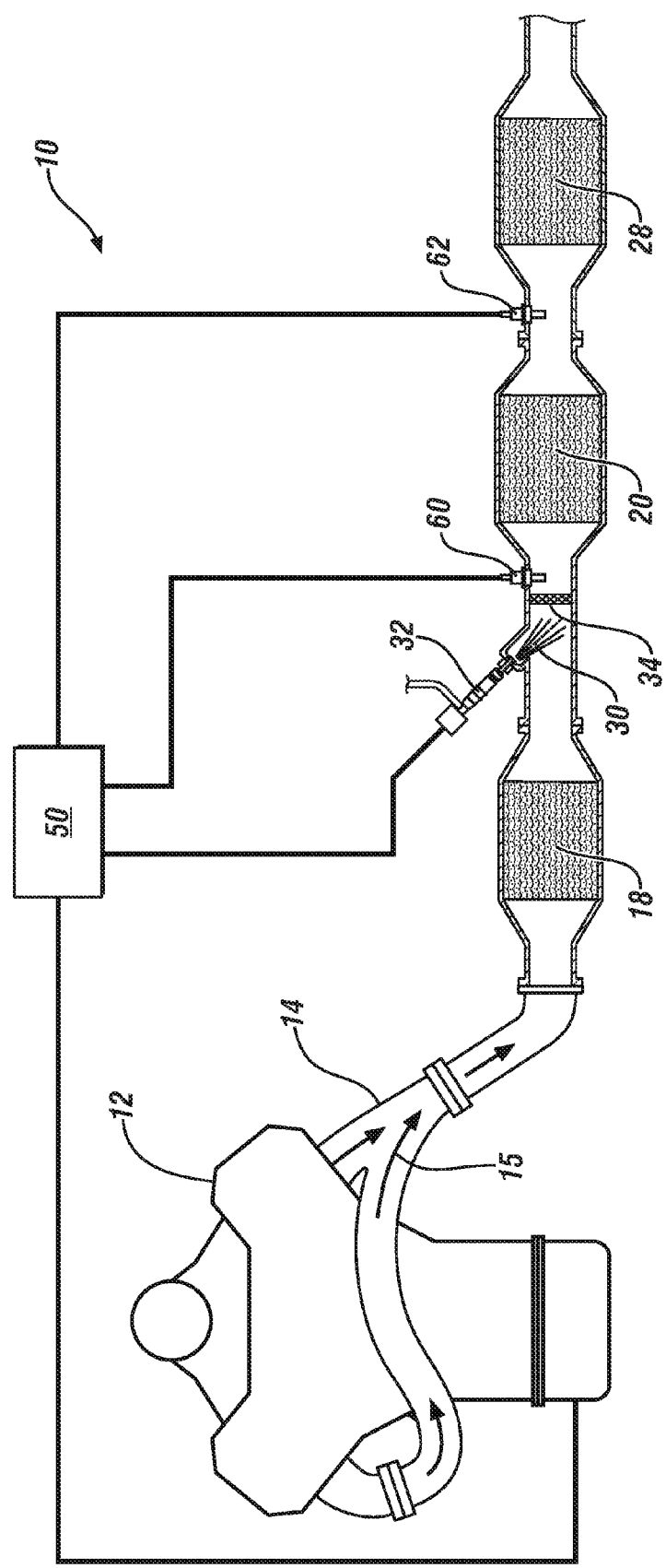
FIG. 1 is a is a schematic diagram of an exemplary exhaust gas treatment system.

The following description is merely exemplary in nature and is not intended to limit the present disclosure, its application or uses. It should be understood that throughout the drawings, corresponding reference numerals indicate like or corresponding parts and features. As used herein, the term control module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion (IC) engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. In the embodiment as illustrated, the exhaust gas treatment system devices include an oxidation catalyst device ("OC") 18, a selective catalytic reduction device ("SCR") 20, and a particulate filter device ("PF") 28. As can be appreciated, the exhaust gas treatment system of the present disclosure may include various combinations of one or more of the exhaust treatment devices shown in FIG. 1, and/or other exhaust treatment devices (not shown), and is not limited to the present example.

In FIG. 1, the exhaust gas conduit 14, which may comprise several segments, transports exhaust gas 15 from the IC engine 12 to the various exhaust treatment devices of the exhaust gas treatment system 10. The OC device 18 is located upstream of the SCR device 20. The SCR device 20 may be disposed downstream of the OC device 18. The SCR device 20 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia ("$NH_3$").

A reductant or diesel exhaust fluid ("DEF") 30 may be supplied from a DEF supply source (not shown) and may be injected into the exhaust gas conduit 14 at a location upstream of the SCR device 20 using an injector 32, or other suitable method of delivery of the DEF 30 to the exhaust gas 15. In one embodiment, the DEF 30 reductant may be an aqueous urea solution that decomposes to ammonia ("$NH_3$") in the hot exhaust gases and is absorbed by the SCR device 20. The ammonia then reduces the $NO_x$ to nitrogen in the presence of the SCR catalyst. The DEF 30 has a quality factor which generally indicates the percentage and/or the purity of the urea present in the DEF 30. A mixer or turbulator 34 may also be disposed within the exhaust conduit 14 in close proximity to the injector 32 to further assist in thorough mixing of the DEF 30 with the exhaust gas 15.

A control module 50 is operably connected to and monitors the engine 12 and the exhaust gas treatment system 10 through a number of sensors. The control module 50 is also operably connected to the engine 12 and the injector 32. The control module 50 is also in communication with a first or upstream $NO_x$ sensor 60 and a second or downstream $NO_x$ sensor 62 that are both in fluid communication with the exhaust gas conduit 14. Specifically, the first $NO_x$ sensor 60 is located upstream of the SCR device 20 and the second $NO_x$ sensor 62 is located downstream of the SCR device 20. The first $NO_x$ sensor 60 and the second $NO_x$ sensor 62 are both configured for detecting a $NO_x$ concentration level in the exhaust gas 15.

Figure 2:
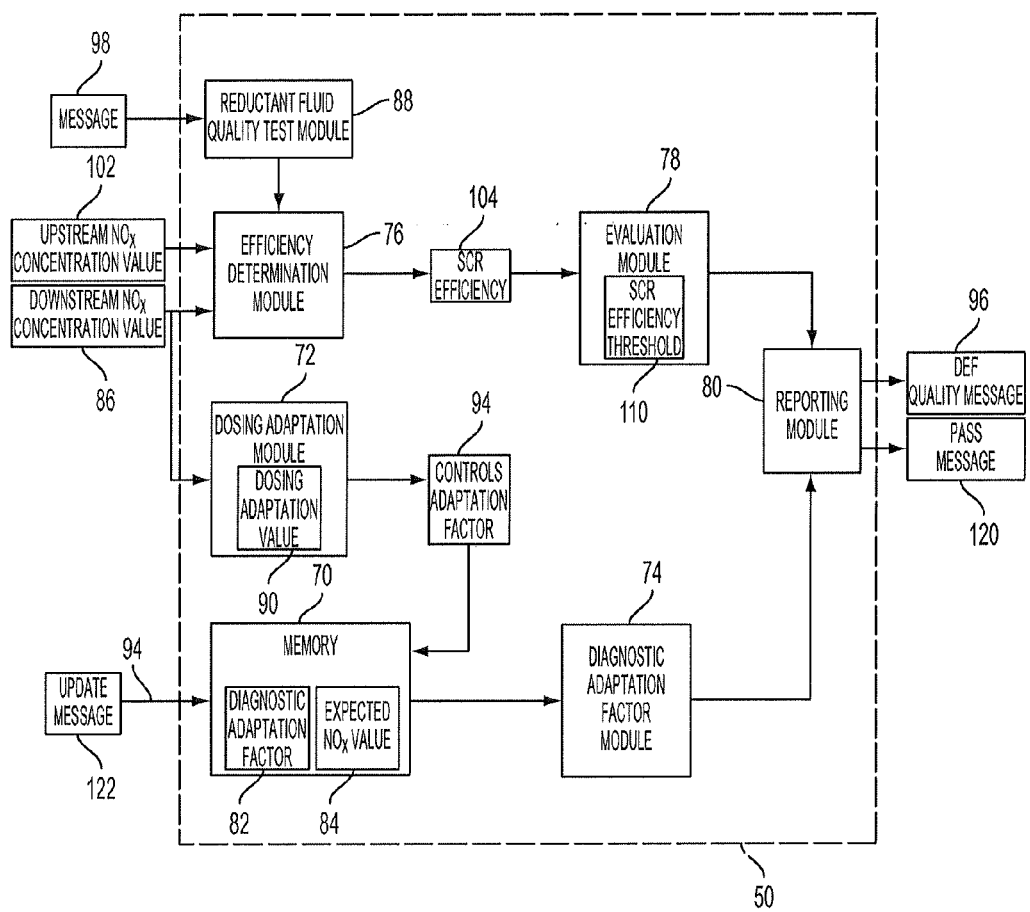
FIG. 2 is a dataflow diagram of a control module shown in FIG. 1.

FIG. 2 is an illustration of a dataflow diagram that illustrates various elements the control module 50 that may be embedded within the control module 50. Various embodiments of the exhaust gas treatment system 10 (FIG. 1) according to the present disclosure may include any number of sub-modules embedded within the control module 50. As can be appreciated, the sub-modules shown in FIG. 2 may be combined or further partitioned as well. Inputs to the control module 50 may be sensed from the exhaust gas treatment system 10, received from other control modules (not shown), or determined by other sub-modules or modules. In the embodiment as shown in FIG. 2, the control module 50 includes a memory 70, a dosing adaptation module 72, a diagnostic adaptation factor module 74, an efficiency determination module 76, an evaluation module 78, a reporting module 80, and a reductant fluid quality test module 88.

The memory 70 stores a diagnostic adaptation factor 82 and an expected $NO_x$ value 84. The diagnostic adaptation factor 82 is an indication of the quality factor for the DEF 30 (shown in FIG. 1). That is, the value of the diagnostic adaptation factor 82 will indicate if the concentration and/or purity of the urea in the DEF 30 is not at least at a specific DEF quality level. If the quality factor of the DEF 30 is not at least at the specific DEF quality level, this is an indication that a downstream $NO_x$ concentration value 86 (detected by the downstream $NO_x$ sensor 62 shown in FIG. 1) may exceed a predetermined level of $NO_x$. For example, the predetermined level of $NO_x$ may be representative of the $NO_x$ concentration levels required by some types of governmental regulations for indicating low quality DEF. The expected $NO_x$ value 84 represents an amount of $NO_x$ located downstream of the SCR device 20.

The dosing adaptation module 72 determines a dosing adaptation value 90 based on a deviation between the downstream $NO_x$ concentration level value 86 and the expected $NO_x$ value 84. The dosing adaptation value 90 represents an adjusted value of the supply of the DEF 30 (FIG. 1) based on the deviation between the downstream NO concentration level 86 and the expected $NO_x$ value 84.

The dosing adaptation module 72 determines if the deviation between the downstream $NO_x$ concentration value 86 and the expected $NO_x$ value 84 exceeds a threshold value stored in the memory 70. If the deviation exceeds the threshold value, this triggers an SCR adaptation. Referring now to FIGS. 1-2, during SCR adaptation, the supply of the DEF 30 from the injector 32 is ceased, and the DEF 30 loaded on the SCR device 20 is depleted. The downstream $NO_x$ sensor 62 located downstream of the SCR device 20 is monitored by the control module 50 to determine if there has been an overdose of DEF 30, an under dose of the DEF 30, or if no decision may be made. If there has been an overdose, the dosing adaptation value 90 is decreased from a nominal value (e.g., if nominal is 1, adaptation will decrease the factor to 0.98 which reduces the dosing amount). If there has been an under dose, the dosing adaptation value 90 is increased from the nominal value (e.g., if nominal is 1, adaptation will increase to 1.12 which increases the dosing amount).

The diagnostic adaptation factor 82 saved in the memory 70 is updated with a controls adaptation factor 94 if the dosing adaptation value 90 of the dosing adaptation module 72 has changed during SCR adaptation (e.g., if the dosing adaptation value 90 is increased or decreased during SCR adaptation). The controls adaptation factor 94 represents an adaptation factor that is adjustable based on the results of the SCR adaptation procedure, and directly affects the amount of the DEF 30 that is dosed to the SCR device 20. In contrast, the diagnostic adaptation factor 82 is a passive value that is stored in the memory 70, and does not directly affect the level of dosing of the DEF 30 to the SCR device 20.

The diagnostic adaptation factor 82 is sent to the diagnostic adaptation factor module 74. The diagnostic adaptation factor module 74 determines if the quality of the DEF 30 is above the specific DEF quality level based on the diagnostic adaptation factor 82. Specifically, the diagnostic adaptation factor module 74 sends a pass/fail status to the reporting module 80, where a pass status is sent if the diagnostic adaptation factor 82 is less than or equal to a threshold value (e.g., in one embodiment 1.4), and a fail status is sent if the diagnostic adaptation factor 82 is greater than the threshold value. The reporting module 80 receives as input the pass/fail status and sets a value of a diagnostic code that is associated with low quality DEF. In one embodiment, the diagnostic code is reported generating a DEF quality message 96 on a serial data bus of the vehicle (not shown).

The approach as described above will allow for the concentration and/or purity of the urea in the DEF 30 to be at lower levels when compared to some other approaches for determining low quality DEF. At the same time, the exhaust gas treatment system 10 will still meet $NO_x$ concentration level requirements that are determined by governmental regulations for indicating low quality DEF.

In another approach to determine if the concentration and/or purity of the urea in the DEF 30 is not at least at a specific DEF quality level, a reductant fluid quality test may be performed. Continuing to refer to FIGS. 1-2, in one exemplary embodiment the control module 50 is in communication with a diagnostic tool (not shown), where the diagnostic tool sends a message 98 through the serial data bus of the vehicle (not shown). The reductant fluid quality test module 88 is in communication with the serial data bus and receives the message 98 from the diagnostic tool, where receipt of the message 98 will initialize the reductant fluid quality test by the reductant fluid quality test module 88.

The reductant fluid quality test is generally performed at a service center (e.g. an automotive dealership) and is used to clear a fault code stored in the control module 50 that indicates the quality of the DEF 30 has dropped below a threshold value. In one exemplary embodiment, the service healing test may include operating the engine 12 at an elevated idle RPM (e.g., at about 1900 RPM). The reductant fluid quality test module 88 controls the injector 32 to cease dosing of the DEF 30. In turn, the DEF 30 loaded on the SCR device 20 is eventually depleted. The injector 32 is then activated to resume dosing. The reductant fluid quality test module 88 monitors the amount of DEF 30 that is released by the injector 32 into the exhaust gas 15. The reductant fluid quality test module 88 is in communication with the efficiency determination module 76. The efficiency determination module 76 performs a SCR efficiency diagnostic if the amount of DEF 30 released by the injector 32 is within a specified range. It should be noted that while the amount of DEF 30 that is released by an injector is discussed, it is understood that additional conditions may exist as well to determine if the SCR efficiency diagnostic is performed by the efficiency determination module 76. For example, some other conditions that determine whether the efficiency diagnostic is performed include, but are not limited to, if the catalyst temperature of the SCR device 20 is within a specified temperature range, and if the exhaust gas flow is within a specified range.

Continuing to refer to FIGS. 1-2, the SCR efficiency diagnostic is performed by the efficiency determination module 76. The SCR efficiency diagnostic may involve monitoring the upstream $NO_x$ sensor 60 and the downstream $NO_x$ sensor 62 for the $NO_x$ concentration levels. Specifically, an upstream $NO_x$ concentration value 102 detected by the upstream $NO_x$ sensor 60 is designated as a $NO_x$ Up level, and the downstream $NO_x$ concentration value 86 that is detected by the downstream $NO_x$ sensor 62 is designated as a $NO_x$ Down level. It should be noted that while the upstream $NO_x$ sensor 60 and the downstream $NO_x$ sensor 62 are illustrated, in another embodiment the upstream $NO_x$ sensor 60 and the downstream $NO_x$ sensor 62 may be omitted. Instead, the control module 50 may include control logic for monitoring various operating parameters of the engine 12 to determine the upstream $NO_x$ concentration value 102 and the downstream $NO_x$ concentration value 86. For example, the operating parameters include, but are not limited to, boost pressure, engine air temperature, EGR flow, fuel injection quantity, and injection timing of the engine 12.

In one exemplary embodiment, the efficiency determination module 76 determines an SCR efficiency 104 based on the following equation:

$$SCR\ Efficienc = 1 - NO_x\ Down\ level/NO_x\ Up\ level.$$

The evaluation module 78 receives as input the SCR efficiency 104. The evaluation module 78 includes control logic for comparing the SCR Efficiency 104 with a SCR Efficiency Threshold 110 to determine a pass/fail status. Specifically, in the event that the SCR Efficiency 104 is greater than the SCR Efficiency Threshold 110, then the pass/fail status is set to pass. The fault code stored in the control module 50 that indicates low quality DEF 30 is then cleared. Also, the reporting module 80 receives as input the pass status from the evaluation module 78. The reporting module 80 sends a pass message 120 to the diagnostic tool (not shown) through the serial data bus indicating the pass status. The diagnostic tool then sends an update message 122 back to the control module 50. The update message 122 updates the diagnostic adaptation factor 82 saved in the memory 70 with the controls adaptation factor 94. Specifically, the update message 122 sets the diagnostic adaptation factor 82 to the controls adaptation factor 94, which is the nominal value (e.g., 1).

In the event that the SCR Efficiency 104 is less than or equal to the SCR Efficiency Threshold 110, then the pass/fail status is set to fail. The reporting module 80 receives as input the fail status from the efficiency determination module 76, which indicates that the quality of the DEF 30 is still relatively low, and the fault code stored in the control module 50 remains. The reporting module 80 may also send the DEF quality message 96 associated with low quality DEF through the serial data bus.

The approach as described above will allow for the reductant fluid quality test to be performed, without modifying the diagnostic adaptation factor 82 unless the reporting module 80 sends a pass message 120 to a diagnostic tool. Thus, if the vehicle (not shown) is taken to a dealership because a fault code indicating low quality DEF 30 has been generated, a service technician may only clear the fault code if the reductant fluid quality test passes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
   an exhaust gas conduit in fluid communication with, and configured to receive an exhaust gas from the internal combustion engine;
   a diesel exhaust fluid ("DEF") source in fluid communication with the exhaust gas conduit, the DEF source supplying a DEF having a quality factor;
   a selective catalytic reduction ("SCR") device in fluid communication with the exhaust gas conduit and configured to receive the exhaust gas;
   a $NO_x$ sensor in fluid communication with the exhaust gas conduit, the $NO_x$ sensor located downstream of the SCR device and configured for detecting a $NO_x$ concentration value; and
   a control module in communication with the DEF source and the $NO_x$ sensor, the control module comprising a set of electronic circuits configured to:
   store a diagnostic adaptation factor and an expected $NO_x$ value, wherein the diagnostic adaptation factor is an indication of the quality factor for the DEF;
   determine a controls adaptation factor based on a deviation between the $NO_x$ concentration value and the expected $NO_x$ value;
   selectively update the diagnostic adaptation factor with the controls adaptation factor;
   preserve the selectively updated diagnostic adaptation factor if a reductant fluid quality test is determined to be failed; and
   reset the selectively updated diagnostic adaptation factor to a nominal value if the reductant fluid quality test is determined to be passed.

2. The exhaust gas treatment system of claim 1, wherein the DEF is a urea based solution, and wherein the quality factor is based on at least one of a percentage of the urea and a purity of the urea present in the DEF.

3. The exhaust gas treatment system of claim 1, wherein a dosing adaptation value is based on an SCR adaptation, and wherein the diagnostic adaptation factor is updated with the controls adaptation factor if the dosing adaptation value changes after the SCR adaptation.

4. The exhaust gas treatment system of claim 1, the set of electronic circuits is further configured to receive the diagnostic adaptation factor.

5. The exhaust gas treatment system of claim 4, wherein the set of electronic circuits is further configured to send a fail status to a reporting module if the diagnostic adaptation factor is greater than a threshold value.

6. The exhaust gas treatment system of claim 4, wherein the set of electronic circuits is further configured to report a pass status if the diagnostic adaptation factor is one of equal to or less than a threshold value.

7. The exhaust gas treatment system of claim 1, wherein the set of electronic circuits is further configured to initiate the reductant fluid quality test upon receiving a message from a diagnostic tool, monitor the DEF source, and determine an amount of DEF that is released from the DEF source during the reductant fluid quality test.

8. The exhaust gas treatment system of claim 7, wherein the set of electronic circuits is configured to determine an SCR efficiency value based on an upstream $NO_x$ value and the $NO_x$ concentration value if the amount of DEF that is released from the DEF source is within a specified range.

9. The exhaust gas treatment system of claim 8, wherein the set of electronic circuits is further configured to determine if the SCR efficiency value is greater than an SCR Efficiency Threshold value, and wherein the reductant quality test is determined to be passed if the SCR efficiency value is greater than the SCR Efficiency Threshold value.

10. The exhaust gas treatment system of claim 8, wherein the SCR efficiency value is calculated using the following equation:

$$\text{SCR Efficienc} = 1 - NO_x \text{ Down level}/NO_x \text{ Up level}$$

wherein $NO_x$ Up level is the upstream $NO_x$ value and $NO_x$ Down level is the $NO_x$ concentration value.

11. An exhaust gas treatment system for an internal combustion engine having a plurality of operating parameters, comprising:
   an exhaust gas conduit in fluid communication with, and configured to receive an exhaust gas from the internal combustion engine;
   a diesel exhaust fluid ("DEF") source in fluid communication with the exhaust gas conduit, the DEF source supplying a DEF that includes a quality factor;
   a selective catalytic reduction ("SCR") device in fluid communication with the exhaust gas conduit and configured to receive the exhaust gas; and
   a control module in communication with the DEF source and the internal combustion engine, the control module comprising:
   a memory having a set of instructions;
   a processor configured to execute the instructions, the instructions comprising:
   determining an upstream $NO_x$ concentration level of the SCR device and a downstream $NO_x$ concentration level of the SCR device based on the plurality of operating parameters;
   selectively being activated to perform a reductant fluid quality test;
   storing a diagnostic adaptation factor that is an indication of the quality factor for the DEF;
   determining an SCR efficiency value based on the upstream $NO_x$ concentration level and the downstream $NO_x$ concentration level;
   determining if the SCR efficiency value is greater than an SCR Efficiency Threshold value;
   setting the diagnostic adaptation factor to a nominal value upon receiving a message indicating that the reductant fluid quality test is passed; and
   keeping the diagnostic adaptation factor unchanged so as to preserve the indication of the quality factor for the DEF if the control module does not receive a message indicating that the reductant fluid quality test is passed, wherein the reductant fluid quality test is determined to be passed based on determining that the SCR efficiency value is greater than the SCR Efficiency Threshold value.

12. The exhaust gas treatment system of claim 11, wherein the instructions further comprise monitoring the DEF source during the reductant fluid quality test for an amount of DEF released from the DEF source and determining the SCR efficiency value if the amount of DEF released from the DEF source is within a specified range during the reductant fluid quality test.

13. The exhaust gas treatment system of claim 11, wherein the instructions further comprise storing an expected $NO_x$ value and determining a controls adaptation factor based on a deviation between the downstream $NO_x$ concentration level and the expected $NO_x$ value.

14. The exhaust gas treatment system of claim 13, wherein a dosing adaptation value is based on an SCR adaptation, and wherein the diagnostic adaptation factor is updated with the controls adaptation factor if the dosing adaptation value changes after the SCR adaptation.

15. The exhaust gas treatment system of claim 13, wherein the instructions further comprise receiving the diagnostic adaptation factor.

16. The exhaust gas treatment system of claim 15, wherein the instructions further comprise reporting a fail status if the diagnostic adaptation factor is greater than a threshold value.

17. The exhaust gas treatment system of claim 15, wherein the instructions further comprise sending a pass status to a reporting module if the diagnostic adaptation factor is one of equal to or less than a threshold value.

18. The exhaust gas treatment system of claim 11, wherein the DEF is a urea based solution, and wherein the quality factor is based on at least one of a percentage of the urea and a purity of the urea present in the DEF.

19. The exhaust gas treatment system of claim 11, wherein the plurality of operating parameters of the internal combustion engine include at least one of an engine speed, a boost pressure, an engine air temperature, an EGR flow, a fuel injection quantity, and injection timing.

20. The exhaust gas treatment system of claim 11, comprising a first $NO_x$ sensor and a second $NO_x$ sensor in fluid communication with the exhaust gas conduit, the first $NO_x$ sensor located upstream of the SCR device to detect the upstream $NO_x$ concentration level and the second $NO_x$ sensor located downstream of the SCR device to detect the downstream $NO_x$ concentration level, wherein the control module is in communication with the first $NO_x$ sensor and the second $NO_x$ sensor.

* * * * *